(No Model.)  2 Sheets—Sheet 1.

C. F. HOLDSHIP.
METER.

No. 565,208. Patented Aug. 4, 1896.

Witnesses
Lindsay W. B. Little
Robert C. Totten

Inventor
Charles Friedrich Holdship
By Kay & Totten
Attorneys (No Model.) 2 Sheets—Sheet 2.

C. F. HOLDSHIP.
METER.

No. 565,208. Patented Aug. 4, 1896.

Witnesses
Lindsay McB. Little
Robert C. Totten

Inventor
Charles Frederick Holdship
By Kay & Totten
Attorneys

UNITED STATES PATENT OFFICE.

CHARLES FREDERICK HOLDSHIP, OF ALLEGHENY, PENNSYLVANIA.

METER.

SPECIFICATION forming part of Letters Patent No. 565,208, dated August 4, 1896.

Application filed April 19, 1894. Serial No. 508,146. (No model.)

*To all whom it may concern:*

Be it known that I, CHARLES FREDERICK HOLDSHIP, a resident of Allegheny, in the county of Allegheny and State of Pennsylvania, have invented a new and useful Improvement in Meters; and I do hereby declare the following to be a full, clear, and exact description thereof.

My invention relates to meters, and more particularly to what are known as "dry" meters.

The principal objects of my invention are to provide a simple and compact form of meter in which all of the joints of the bellows-chambers through which the measured gas is passing to the outlet lead into the main inner chamber, so that in case of any leakage from the bellows-pockets it will pass into such main chamber, and as the pressure of the gas in the bellows-pockets is at no time more than a fraction greater than that within the main chamber any such leakage will not make a perceptible difference in the measuring of the gas by the meter, and liability of leakage from any such bellows-pocket directly into the atmosphere is overcome.

My invention has also for its object certain improvements in the construction of the meter, all of which will be hereinafter set forth and claimed.

In its general form the meter comprises a case or shell having a series of bellows-pockets secured in place therein, so that in case of any leakage from the same it will be held within the main shell and enter the main or exhaust chamber thereof, as above stated, a supply-pipe, a valve controlling the flow from such pipe to the bellows and to the exhaust-chamber in the interior of the shell or casing, a crank, and a series of crank-arms connected to the bellows and to said crank for operating the valve.

To enable others skilled in the art to make and use my invention, I will describe the same more fully, referring to the accompanying drawings, in which—

Figure 1:
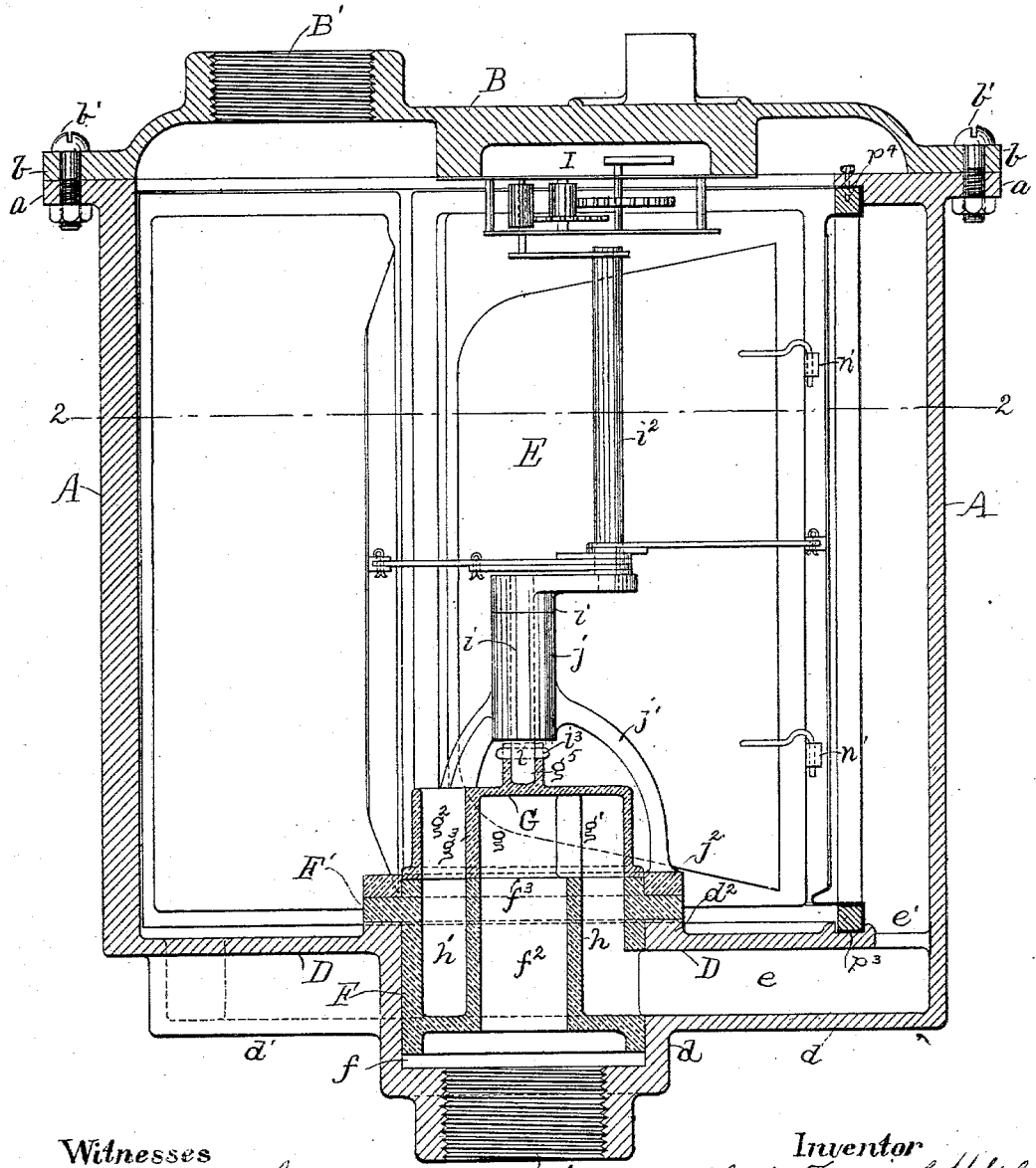
Figure 2:
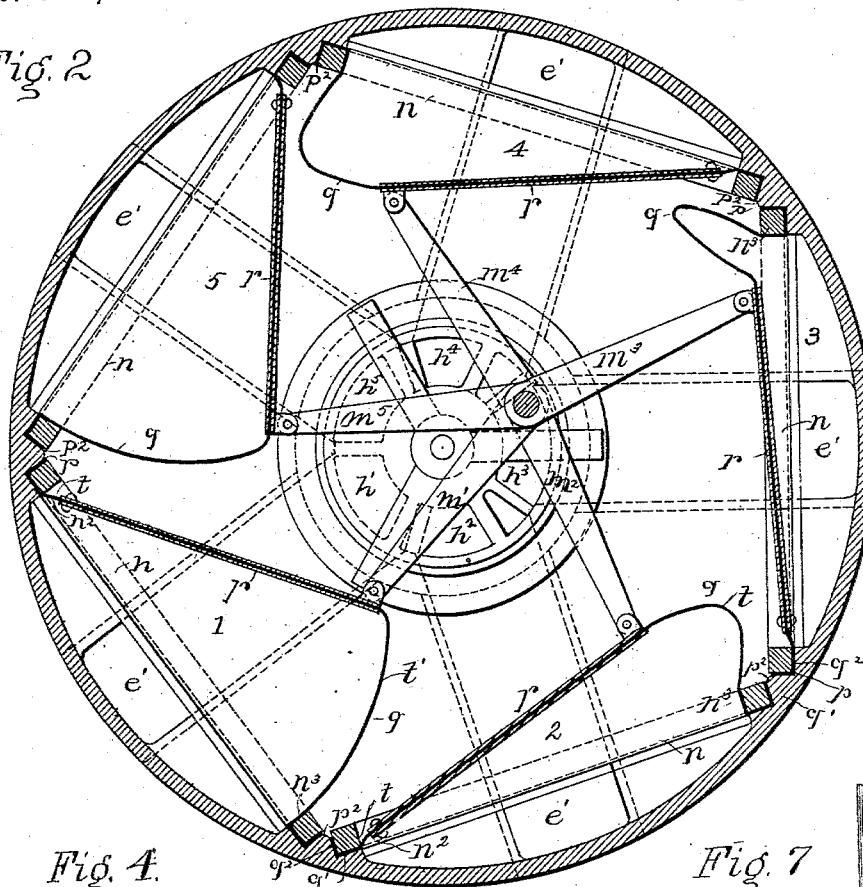
Figure 4:
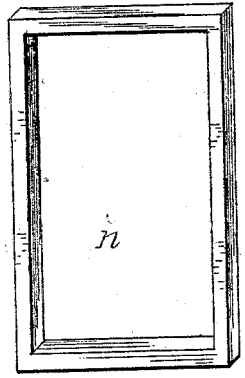
Figure 5:
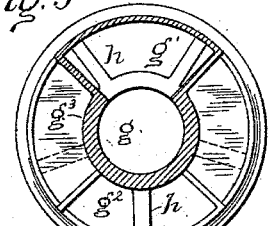
Figure 6:
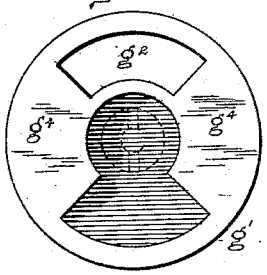
Figure 7:
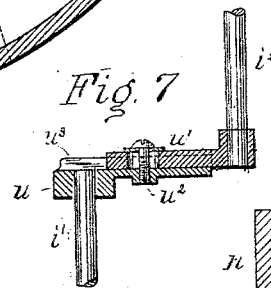
Figure 3:
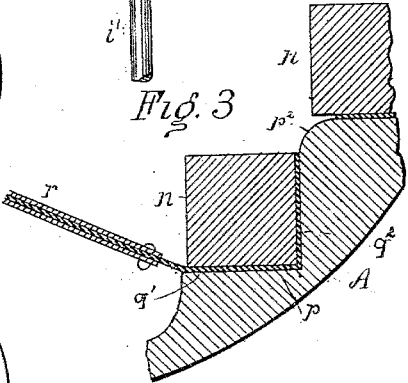

Figure 1 is a vertical sectional view of a meter embodying my invention. Fig. 2 is a cross-section of the same on the line 2 2, Fig. 1. Fig. 3 is an enlarged detail view illustrating the method of securing the bellows and its frame in the shell. Fig. 4 is a view of one of the frames. Figs. 5 and 6 are detail views of the valve, and Fig. 7 is a detail view of the joint in the crank-arm.

Like letters of reference indicate like parts in each.

The casing or shell A is preferably cast in one piece, though in large meters it may be formed in two or more pieces connected by transverse flange-joints, one of the features of construction being the reduction of joints for the escape of gas from the body of the meter.

The shell A has at its upper end the annular flange $a$, with which the cover B is connected by bolts $b'$, passing through the outer portion or annular flange $b$ of the cover and $a$ of the shell, the cover having the escape-outlet B', with which the house-supply pipe communicates. The base of the casing is closed by the bottom D, formed in the drawing shown as part of the shell A, and in the center thereof is the boss $d$, having radial wings $d'$ extending out therefrom, these wings corresponding in number to the number of bellows-pockets in the meter. The boss $d$ has the inlet-port D', and leading through each radial wing is the passage $e$, communicating with the respective bellows-pockets 1 2 3 4 5 of the meter by a port $e'$.

It is of great importance in the matter of economy, simplicity, and security of the joints that the several parts should be made so that they can be quickly and easily finished, and the necessary valve-seats and such parts be secured in place at but little cost. This is accomplished in the present meter in the following way: Formed centrally in the meter-casing in the boss $d$ and communicating with the passages $e$ in the wings $d'$ is the recess $f$, which is reamed out after casting by suitable machinery to receive the bushing or sleeve F, forming the seat for the valve G and the several ports communicating or leading from said valve into the passages communicating with the several bellows-pockets. It will be seen that the recess $f$ can be easily and at small cost reamed out to receive the sleeve F, and also that above the base D of the shell is the annular raised shoulder or face $d^2$, which can at the same time be faced off to receive the annular flange F' of the sleeve F, and in this way a snug and exact seat for the sleeve F is provided by which a gas-tight joint can be easily obtained. In this way the seat for the valve is also placed at the base of the meter-shell, which is very desirable for simplicity of construction and ease of action of the meter-valve. The sleeve F has the central passage $f^2$, communicating with the inlet-port D', and around the same a series of division-walls $h$, dividing the valve-seat $f^3$ into a series of chambers $h'$ $h^2$ $h^3$ $h^4$ $h^5$, communicating with the respective passages $e'$, leading to the respective bellows-pockets 1 2 3 4 5. In this way the flow of the gas from the inlet-port through the passage $f^2$ and thence to the radial wings and bellows-pockets is controlled by the valve G, fitting in the valve-seat $f^3$. The construction of this valve can be more easily understood from the bottom view thereof, Fig. 6, and the sectional view in Fig. 1, the valve having the central chamber $g$ and at the side thereof the side inlet-chamber $g'$, which communicates with the several chambers $h'$ $h^2$, &c., the central portion $g$ and side portion $g'$ forming communication from the inlet-passage $f^2$ to the bellows-pockets, and the valve has also the escape-outlet $g^2$, which travels over the same ports $h'$ $h^2$, &c., the central valve-port $g$ being separated from the exhaust-port $g'$ by the concentric wall $g^3$, which coincides and travels over the wall separating the inlet-passage $f^2$ from the passages $h'$ $h^2$, &c. The side inlet-passage $g'$ and the outlet-passage $g^2$ of the valve G are of such size that they extend entirely over one of the ports $h'$ $h^2$ and over one or more at the side thereof, so that two or more ports and the bellows controlled thereby are always receiving gas, the gases being exhausted from two or more ports. It will be noticed from the separate view of the valve that between the inlet-space $g'$ and the exhaust-space $g^2$ there are the flat valve-faces $g^4$, which cover and close the valve-ports, not either receiving or ejecting the gas as the valve rotates. This valve G is preferably formed of aluminium or alloy thereof to form the same as light as possible and overcome friction in the meter. It is turned by the crank-shaft $i$, having the crank $i'$ and the crank-arm $i^2$, which engages with the registering mechanism I, which does not require to be described. This crank-shaft $i$ is mounted in a bearing $j$, which is supported by the arms $j'$ and the ring $j^2$, resting on the flange F' of the sleeve F and secured thereto by suitable bolts or screws.

The valve G has a socket $g^5$ at the end thereof, having one or more notches or recesses in the upper edge of said socket, in which a pin $i^3$ in the crank-shaft $i$ fits, so providing for the turning of the valve upon its valve-seat, the valve being held concentric by the crank-shaft $i$ and at its lower edge fitting within the ring $j^2$ of the bearing or frame of the crank-shaft. The crank-shaft is turned by the movement of the bellows-pockets, which are connected to the same by a series of arms $m'$ $m^2$ $m^3$ $m^4$ $m^5$, which arms fit around the crank-arm $i^2$ of the crank-shaft and engage with the bellows plates or leaves of the bellows-pockets, as hereinafter described.

It will be noticed that the gas enters at the bottom of the valve mechanism and that its pressure is upwardly against the valve itself as it rests upon its seat, while the measured gas passes within the central chamber of the meter and passes therefrom as used. This, outside of the advantages above described, has the further advantage of overcoming friction of the valve upon its seat, as the pressure of the gas, instead of forcing the valve against its seat, has a slight tendency to lift the valve, this of course not being sufficient in the difference of pressure between the measured and unmeasured gas to actually raise the valve from its seat, but assisting in overcoming the friction of the valve on its seat, so causing the valve to run with less friction, enabling the meter to operate at less pressure and preventing wear between the valve and its seat.

An important part of the present invention, and which has not been previously described because I desired the general construction to be understood, is in the arrangement of the bellows-pockets with relation to the outer shell and central exhaust-chamber. It will be seen that the gas is discharged through the outlet-port $g^2$ of the valve into the central chamber E, from which the gas escapes through the outlet-port B'. The bellows-pockets are so secured within the shell A that all leakage of gas must pass into this central exhaust-chamber E, and as the only difference in pressure between said chamber and the gas within the bellows-pockets is whatever slight reduction is effected through the operation of the valve G and the friction of the gas passing through the ports, which is very slight even in a high-pressure meter, the liability of leakage from these bellows-pockets is therefore reduced to a minimum, as the gas in the exhaust-chamber E is at almost as high pressure as that in the bellows-pockets which is then being measured. The manner in which these bellows-pockets are secured in place is illustrated in the drawings as well by Figs. 1 and 2 as by Fig. 3, which is a large sectional view illustrating the method of securing the flexible body of the bellows in place.

In casting the shell A of the meter I form seats $p$ for the reception of the rectangular bellows-frames $n$. Each frame is formed of rectangular bars and corresponds in shape to the seat for the same in the meter-shell, and fits the same almost snugly, but can be forced into said seat when the leather or other flexible material forming the flexible portion of the bellows-pockets is secured thereto. Cast within the shell $a$ are the rectangular seats or recesses $p$ for receiving said bellows-frames, it being seen that the vertical portions of said seats are divided by the V-shaped projections $p^2$, Fig. 2, and that the horizontal portion $p^3$ of such seat extends along the base D of the shell, while the horizontal portion $p^4$ is formed in projections $a'$, extending out from the shell A and forming the top portions of the bellows-pockets. The inner edges of these projecting portions $a'$ of the shell are practically chords of a circle formed on the line of the vertical portions $p'$ of the seats $p$. In order to form the flexible portion of the bellows, I employ single pieces of leather or like flexible impervious material $q$ and a sheet-metal plate or plates secured thereto.

I will first describe the method of securing the bellows-bodies and their frames in the seats $p$, formed in the shell A. For this purpose each leather body $q$ is secured around the back faces and outer faces of the frame, as at $q' q^2$, Figs. 2 and 3, being secured thereto by a suitable shellac or cement, and the seat $p$ being coated with like cement, and the frame is then forced into the seat, so that the portions $q' q^2$ are firmly held between the faces of the frame and the angular faces of the seat $p$, extending along both the vertical and horizontal portions thereof, the principal joint depended upon being the portion $q^2$ of the leather held between the outer faces of the frame and the faces of the seat corresponding thereto, it being found that the compression of the leather in the shellac or cement between the frame and seat forms an extremely simple and efficient joint. The leaves $r$ of the bellows may be formed of a single thin sheet-metal plate, or, as shown in the drawings and preferred by me, of two sheet-metal plates, one on each side of the flexible bellows-body, these plates being secured thereto by a suitable number of rivets. Where a single plate is used, it is secured on the outer face of the bellows-body, and the arms $m' m^2$, &c., connect the crank-arm $i^2$ with said bellows-leaves. In either case it will be noticed that as the pressure is always from within outwardly in said chambers, if a single outer plate is employed the bellows-body is always kept expanded against the same, though a stronger and better construction is obtained by the employment of the plates or leaves on each side thereof, as more particularly shown in the drawings.

One special point in connection with the bellows-body is shown and requires attention. Though the leaves $r$ may be hinged by direct pintle connections with the frames $n$, such as shown at $n'$, Fig. 1, I prefer to so secure the bellows-leaves to the bellows that the leather of the bellows will form the hinge connection, which gives all the swinging or hinge action desired, and is found to be durable, as the leaves are made of very thin metal plates, light in weight, and practically no strain is brought upon the leather. For this purpose, as clearly shown in the drawings, the bellows-leaves are secured to the flexible bellows-body close to one vertical frame-bar, as at $n^2$, and at a distance from the other vertical frame-bar $n^3$, forming, with said frame-bar $n^2$, the hinge connection for the operation of the bellows, the portion $t$ of the bellows-body acting as such hinge, while the portion $t'$ acts as the gas-holding portion of the bellows between the leaves $r$ and the vertical bar $n^3$ of the frame $n$. It will be noticed that the bearings $m$, with which the bars connecting the bellows with the crank-arm $i^2$ are journaled, are at the opposite edges of the leaves $r$ from those forming the hinge connection, so that in the movement of the bellows the full movement caused by the expansion of the bellows will be imparted from the rigid leaf through the bar to the crank-arm, there being but little movement of the hinge portion $t$ of the bellows.

In Fig. 7 I have illustrated the sliding joint in the crank-arm $i^2$ of the crank-shaft $i$, which joint performs a peculiar function in connection with the several bellows parts. The throw of the bellows with relation to the rotation of the crank-shaft regulates the amount of gas measured. For example, supposing that to measure one foot of gas the crank-shaft is arranged to rotate five times, then the amount of gas actually measured will necessarily depend upon the movement of the bellows in so measuring the gas, and this movement of the bellows is controlled by the crank-arms. If the throw of the crank is increased, the movement of the bellows is correspondingly increased, and the amount of gas required to give each stroke or rotation of the valve increases, or vice versa. It is therefore important to have an adjusting means for the meter, and this I obtain in the crank $i'$, which is formed of two parts $u u'$, one part connected to the crank $i'$ and the other part to the crank-arm $i^2$, and said parts being united by a sliding joint having a bolt or screw $u^2$ passing through a slot in one part and entering a threaded seat in the other, and so providing for the increasing or diminishing of the length of the crank $i'$. To properly support the two parts, the part $u$ of the crank has side flanges $u^3$ extending up around the part $u'$ thereof, between which flanges the part $u'$ can be wedged by the bolt $u^2$.

When the meter is in use, the gas enters through the inlet-port D' and passes through the central passage $f^2$ of the sleeve or bushing F into the central chamber $g$ of the valve G, and thence into the side inlet-chamber $g'$ of said valve and down through the ports $h'$ $h^2$, &c., into the different bellows-pockets, and by pressure upon the bellows-pockets and their leaves imparts motion to the crank-shaft $i$, which, through the several arms $m'$ $m^2$, &c., operated by the respective bellows-pockets, causes the turning of the valve. As the valve is turned the exhaust-port $g^2$ thereof is brought over the valve-ports $h'$ $h^2$, &c., which have been previously filled with gas, so that as other bellows-pockets are filled with gas the gas is expelled from those previously filled and enters the central exhaust-chamber E, flowing therefrom through the outlet-port B' to any suitable point desired.

The valve being mounted near the base of the casing, and being properly centered and supported, moves with slight pressure, so that there is but little friction thereof, and this friction is also decreased by the incoming gas, which operates against the weighted valve, as above described. As the pockets are expanded or compressed, either by the gas or by the pressure of the leaves on the flexible bodies thereof, the leaves swing on the flexible leather hinge connections with the frames, and the flexible bodies are always held against said leaves by the pressure of the gas within the chamber, so that a very simple and efficient form of bellows-meter is obtained. For all practical purposes tight joints are formed between the bellows-pockets and the interior chamber E, but in case of any leakage it will enter into the said chamber E, which contains gas at almost as high pressure, so that leakage is reduced to a minimum, this being a very important improvement in meters where leakage directly into the atmosphere may take place, and where, in high-pressure meters, the joints through which such leakage could occur may be required to hold several pounds pressure. At the same time, as the joint between the cover and exhaust-port is formed by flanges on the shell and cover, and these flanges extend beyond the main body of the meter and have bolts passing through the same, the gasket placed between the two flanges may be so compressed as to secure a positive tight joint and all leakage from the meter be prevented. In the testing of the meter the crank $i'$ is adjusted approximately to the desired throw, and if, upon the testing of the meter, it is found that too much or too little gas passes through the same, the length of throw may be increased or diminished in the manner above described, and an accurate registering of the gas passing through the meter will thus be obtained. The meter is simple in construction, cheap in cost, and found to be efficient in action.

While I have described the apparatus as a meter, for which purpose it is more especially applicable, it may be also employed with advantage as a pump, the only difference being that the power is applied to turn the crank-shaft instead of the power being applied by the pressure of the gas within the bellows to the crank-shaft, and it is to be understood that the claims made extend to the pump as well as to the meter.

What I claim as my invention, and desire to secure by Letters Patent, is—

1. The combination with an outer shell or casing having a central chamber and an outlet-port leading therefrom, and having a series of angular seats $p$ formed in the shell thereof, of the angular frames corresponding to such seats, and the flexible bellows-bodies each having its portions $q'$ $q^2$ cemented to the back and outer edges $s$ $s'$ of the frame and clamped thereby in the angular seat $p$ formed in the shell or casing, substantially as set forth.

2. The combination of an outer shell or casing having a central boss at one end thereof provided with an inlet-port and a central recess, hollow wings leading from said boss and forming passages to the bellows-pockets, and a central sleeve or bushing fitting in the central recess of the boss and forming the valve-seat, said bushing having a central passage and a series of radial passages leading to the passages formed in the wings, substantially as set forth.

3. The combination of an outer shell or casing having a central boss at one end thereof provided with an inlet-port and a central recess, hollow wings leading from said boss and forming passages to the bellows-pockets, a central sleeve or bushing fitting in the central recess of the boss and forming the valve-seat, said bushing having a central passage and a series of radial passages leading to the passages formed in the wings, and having a flange extending beyond the valve-seat, a bearing having a ring fitting on said flange and extending above the valve-seat and supporting the crank-shaft, and a valve fitting in said valve-seat within said ring and turned by the crank-shaft, substantially as set forth.

In testimony whereof I, the said CHARLES FREDERICK HOLDSHIP, have hereunto set my hand.

CHARLES FREDERICK HOLDSHIP.

Witnesses:
JAMES I. RAY,
ROBERT C. TOTTEN.